United States Patent
Lindemann et al.

(10) Patent No.: US 11,892,302 B2
(45) Date of Patent: Feb. 6, 2024

(54) METHOD AND DEVICE FOR GENERATING DYNAMIC INDICATIONS RELATING TO A MODIFICATION OF ROUTE GUIDANCE

(71) Applicant: Continental Automotive GmbH, Hannover (DE)

(72) Inventors: Robert Lindemann, Hannover (DE); Jonas Hellhund, Hannover (DE)

(73) Assignee: Continental Automotive GmbH, Hannover (DE)

( * ) Notice: Subject to any disclaimer, the term of this patent is extended or adjusted under 35 U.S.C. 154(b) by 195 days.

(21) Appl. No.: 16/608,634

(22) PCT Filed: Apr. 25, 2018

(86) PCT No.: PCT/EP2018/060546
§ 371 (c)(1),
(2) Date: Oct. 25, 2019

(87) PCT Pub. No.: WO2018/197537
PCT Pub. Date: Nov. 1, 2018

(65) Prior Publication Data
US 2020/0200549 A1 Jun. 25, 2020

(30) Foreign Application Priority Data
Apr. 28, 2017 (DE) .................... 10 2017 207 243.1

(51) Int. Cl.
*G01C 21/34* (2006.01)
*G01C 21/36* (2006.01)
(52) U.S. Cl.
CPC ....... *G01C 21/3415* (2013.01); *G01C 21/367* (2013.01); *G01C 21/3676* (2013.01)
(58) Field of Classification Search
None
See application file for complete search history.

(56) References Cited

U.S. PATENT DOCUMENTS

| 5,243,528 A | 9/1993 | Lefebvre |
| 5,450,343 A | 9/1995 | Yurimoto |

(Continued)

FOREIGN PATENT DOCUMENTS

| CN | 1795366 A | 6/2006 |
| CN | 104823022 A | 8/2015 |

(Continued)

OTHER PUBLICATIONS

Takahiro et al., Translation of JP2007206014A, Aug. 16, 2007, JPO (Year: 2007).*

(Continued)

*Primary Examiner* — Rachid Bendidi
*Assistant Examiner* — Selena M Jin

(57) ABSTRACT

The invention relates to a method for generating dynamic indications relating to a modification of a route guidance. Original navigational directions are generated along an original route between a starting point and a destination. Due to modified traffic conditions, it can happen that an alternative route is preferable. Therefore an alternative route is provided which is different from the original route. According to the invention, when a vehicle is located at a current location on the original route, an alternative route to the destination is determined, comprising the location of the deviation between the original route and the alternative route. The method also comprises the generation of an acoustic indication relating to a modification of the route guidance in accordance with the zoom level of a map section, represented on a display, in respect to the location of the deviation.

20 Claims, 4 Drawing Sheets

(56) References Cited

U.S. PATENT DOCUMENTS

| | | | |
|---|---|---|---|
| 5,809,447 A * | 9/1998 | Kato | G01C 21/3629 |
| | | | 340/996 |
| 7,995,079 B2 | 8/2011 | Bells et al. | |
| 9,360,335 B1 * | 6/2016 | Powelson | G01C 21/3415 |
| 2005/0256639 A1 * | 11/2005 | Aleksic | G01C 21/3415 |
| | | | 340/995.13 |
| 2006/0136125 A1 * | 6/2006 | Chua | G08G 1/096861 |
| | | | 701/532 |
| 2006/0178818 A1 | 8/2006 | Dhollande | |
| 2008/0167804 A1 * | 7/2008 | Geelen | G01C 21/3655 |
| | | | 701/408 |
| 2009/0005964 A1 * | 1/2009 | Forstall | G08G 1/096883 |
| | | | 701/533 |
| 2009/0105949 A1 * | 4/2009 | Bitan | G01C 21/3694 |
| | | | 701/455 |
| 2010/0312466 A1 * | 12/2010 | Katzer | G08G 1/096838 |
| | | | 701/533 |
| 2010/0324817 A1 * | 12/2010 | Hansen | G01C 21/3415 |
| | | | 701/414 |
| 2011/0029231 A1 * | 2/2011 | Mueller | G08G 1/096827 |
| | | | 701/533 |
| 2011/0098915 A1 * | 4/2011 | Disatnik | G01C 21/3415 |
| | | | 701/533 |
| 2013/0006523 A1 * | 1/2013 | Sato | G01C 21/3644 |
| | | | 701/428 |
| 2013/0103313 A1 * | 4/2013 | Moore | G01C 21/3626 |
| | | | 701/533 |
| 2014/0114574 A1 | 4/2014 | Tertoolen et al. | |
| 2015/0247737 A1 | 9/2015 | van Dok et al. | |
| 2017/0276496 A1 * | 9/2017 | Mannami | G01C 21/20 |
| 2017/0314945 A1 * | 11/2017 | König | G01C 21/3484 |
| 2018/0058877 A1 * | 3/2018 | Andrew | G06T 11/00 |

FOREIGN PATENT DOCUMENTS

| | | |
|---|---|---|
| DE | 102006002741 A1 | 8/2007 |
| DE | 102010006702 A1 | 9/2010 |
| DE | 102010023942 A1 | 2/2011 |
| DE | 102014001950 A1 | 8/2015 |
| EP | 1959237 A1 | 8/2008 |
| EP | 3205982 A2 | 8/2017 |
| JP | 2002357426 A * | 12/2002 |
| JP | 2007206014 A * | 8/2007 |
| WO | 2004084437 A1 | 9/2004 |
| WO | 2010/007668 A1 | 1/2010 |
| WO | 2016062730 A1 | 4/2016 |

OTHER PUBLICATIONS

Nakaishi et al., Translation of JP2002357426A, Dec. 13, 2002, JPO (Year: 2002).*

Office Action dated Dec. 13, 2017 from corresponding German Patent Application No. DE 10 2017 207 243.1.

International Search Report and Written Opinion dated Oct. 9, 2018 from corresponding International Patent Application No. PCT/EP2018/060546.

Search Report dated Oct. 26, 2022 from corresponding Chinese patent application No. 201880025106.3.

Office Action dated Nov. 3, 2022 from corresponding Chinese patent application No. 201880025106.3.

Office Action dated Nov. 3, 2022 from corresponding Chinese patent application No. 201880025106.3 (Translated).

Notice of Allowance dated Apr. 24, 2023 from corresponding Chinese patent application No. 201880025106.3.

Abstract of GB 201111135 D0.

Liu Ying "Research on GPS vehicle navigation and positioning method based on GIS technology" Science and Technology Information (Academy Reearch), No. 10, Apr. 5, 2008 (2008).

* cited by examiner

METHOD AND DEVICE FOR GENERATING DYNAMIC INDICATIONS RELATING TO A MODIFICATION OF ROUTE GUIDANCE

BACKGROUND

The invention relates to the field of driving assistance systems, and in particular that of navigation systems. The invention relates in particular to a method and to an apparatus for generating dynamic information about a change to a route plan.

International patent application WO 2010/007668 A1 describes how a unit (102) for defining a free interval decides whether a mover is positioned in a free section of a highway or in a toll section.

Modern vehicle navigation systems are able to access services that provide up-to-date traffic information or up-to-date information about events impeding the traffic flow on a road for a region or a planned route. If a longer route is taken under the guidance of the navigation system, then events that occur only after the route plan has begun and require the route to be changed may be taken into account when calculating a new or alternative remaining route.

The increasing amount of traffic and the constantly increasing number of optical and acoustic signals to which attention has to be paid when driving a vehicle in road traffic—these signals coming from other traffic participants or from driver assistance systems of the vehicle in question—represent a challenge for the driver in terms of perceiving in each case currently relevant signals and ignoring less relevant signals.

Thus, for example, information about a change to the route plan may be beneficial when an estimated arrival time changes significantly, this generally moving backward, or when the travel distance increases significantly. Information about a changed route plan is however irrelevant to most drivers when it does not result in a significant change to the arrival time or the travel distance.

The increasing networking of navigation systems that makes it possible to draw the most up-to-date traffic information and information about the traffic flow within ever shorter time intervals leads to a route plan changing increasingly often while taking a planned route.

In the event of an imperative speech output from the navigation system each time the route changes, however significantly, many drivers attempt to view the changed route on the navigation system. To this end, it is often necessary to change the visible map section by operating a user interface in a corresponding manner, generally by zooming out, as a result of which the driver is distracted from the current traffic scene for a long time overall.

When the driver receives only acoustic information, the attention of the driver may also however be taken up to a greater extent than would be desirable, for instance by long acoustic announcements from the navigation system, which may possibly result from a vanishingly small change to the route. As an alternative, the comfort of the driver or other journey participants is also possibly restricted, since for example the entertainment program, for instance a music track or an audio book, is interrupted for the long acoustic output.

BRIEF SUMMARY

The object of the invention is therefore to as far as possible prevent a driver of a motor vehicle from being unnecessarily distracted by speech outputs from a navigation system.

This object is achieved by a method according to the independent method claim and a data processing device according to the independent device claim. The dependent claims relate to advantageous configurations.

One aspect relates to a method for generating dynamic information about a change to a route plan. The method may be implemented in a computer apparatus that contains one or more processors, such as a navigation system, a smartphone or a tablet. Original navigation directions are generated along an original route between a starting point and a destination. These original navigation directions give the original route. Over time, updated navigation directions are generated periodically in accordance with a movement of the user, which updated navigation directions give an updated route. The updated navigation directions may be generated for example every minute. Due to changed traffic conditions such as traffic congestion, it may be the case that preference should be given to an alternative route, such that the original navigation directions no longer coincide with the updated navigation directions. A deviation from the original route and the alternative route from a particular location therefore occurs. According to the method, an alternative route to the destination, including the location of the deviation between the original route and the alternative route is determined. This may in particular occur when the vehicle is situated at a current location on the original route.

Original route should be understood to mean a route prior to a change. Several changes may take place in succession. By way of example, a first original route may be changed to a first alternative route, and the first alternative route may thereafter be changed to a second alternative route. With regard to the second change from the first alternative route to the second alternative route, the first alternative route is defined as an original route and the second alternative route is defined as an alternative route.

The method then comprises generating acoustic information about a change to the route plan depending on the position of the change in relation to a map section, displayed on a display. The method in particular comprises generating acoustic information about a change to the route plan depending on the zoom level of a map section displayed on a display in relation to the location of the deviation. To generate the acoustic information, this therefore depends on whether the location of the deviation is already situated in the currently displayed map section, or will shortly appear or not appear in the currently displayed map section. This depends on the distance between the position of the vehicle and the location and the deviation, and on the zoom level.

The currently displayed map section is set manually or automatically depending on speed by most drivers such that only few upcoming changes to the travel direction or traffic lane are visible, but for this purpose a relatively large amount of detail is visible in the map shown on the display. It may be assumed that a change to the route plan that takes place at a point of the route that lies far outside the currently displayed map section is less important to the driver, since it leads to corresponding driving maneuvers only some time later. The route may have changed again in this time, such that a speech output made previously later proves to be unnecessary.

A further aspect relates to the generation of the information about a change to the route plan. This may take place when the location of the deviation is situated at a predefined distance outside the edge of the displayed map section. The predefined distance may be given as a proportion of the vertical image height of the map section displayed on the display. A speech output may thus for example be suppressed when the location of the deviation between original and alternative route is situated further than for example 10% or 15% or 20% or 25% of the vertical image height away from the upper edge of the current map display outside of the display area of the screen. The proportion may be able to be set or selected by a user.

As a variant of this aspect, the information about a route change may be output when the location of the deviation between original route and alternative route will be displayed on the screen within a predetermined time interval, for example shortly. This variant includes delaying the outputting of the information until this moment, and situations in which the driver changes the map section of his own volition, such that the changed part of the route comes into the display area. At this moment, the driver is "distracted" in any case, such that the additional distraction is insignificant.

According to another aspect, a speech output is output when the diversion point between original and alternative route is reached within a predefined time. As a result, even when a very small map section is displayed on the navigation display (maximum zoom-in), it is able to be ensured that the information about the changed route is output punctually before the diversion point is reached.

According to another aspect, a speech output is output only when the arrival time changes by a predefined time or a predefined distance, measured in absolute terms or as a percentage with respect to the remaining travel time or remaining travel distance, due to the alternative route. A certain shift of the arrival time to a later time is accepted by most drivers, such that this is not perceived as an inconvenience. In one development of the method, the driver is allowed to define the limits for whether or not an acoustic output should take place himself.

According to another aspect, when there is a speech output according to one of the preceding aspects, the entire route is temporarily, for example for a limited period of time or until confirmation by a user input, displayed automatically, wherein the alternative route is displayed in highlighted form. The alternative route may be displayed in a different color in comparison with the original route, or in flashing form.

According to one variant of the above aspect, when there is a speech output, the region of the changed routes, that is to say just of a section of the entire route, is temporarily displayed automatically. Only a partial area of an entire route between starting point and destination is therefore displayed, wherein the partial area of the entire route comprises the alternative route.

In all aspects, a display of the additional travel time caused by the route change may be displayed in the display; in this case, a display that deviates only slightly from the normal display may be preferred so as not to generate the impression of a warning message. By way of example, the duration added by the change could be placed next to the remaining journey time calculated before the change, for example separated by a "+". This display may be maintained for a certain period of time following the change, for example for five minutes, and the new remaining journey time may then be displayed as a number.

A route change may also result from the fact that the driver travels a different route than that suggested. In this case as well, the updated navigation directions do not match the original navigation directions, since an alternative route to the destination is calculated. The vehicle is then situated at a current location on the alternative route. The location of the deviation between original route and alternative route has already been passed by the vehicle. In this case as well, acoustic information may be provided about a change to the route plan depending on the zoom level of a map section displayed on a display in relation to the location of the deviation. Since the location of the deviation has already been passed, acoustic information will be provided in particular only when the alternative route plan induced by the driver himself leads to a not inconsiderable additional travel time. There may be situations in which the driver expects information a fortiori only when there is a considerable route change.

One aspect furthermore relates to a data processing device having at least one processor configured so as to generate original navigation directions along an original route between a starting point and a destination. The processor is furthermore configured, in particular when the vehicle is situated at a current location of the original route, so as to determine an alternative route to the destination, including a location of the deviation between the original route and the alternative route. The navigation system furthermore has output means for generating acoustic information about a change to the route plan depending on the zoom level of a map section displayed on a display in relation to the location of the deviation.

BRIEF DESCRIPTION OF THE FIGURES

The invention will be described below on the basis of exemplary embodiments with reference to figures. In the figures.

DETAILED DESCRIPTION

Figure 1:
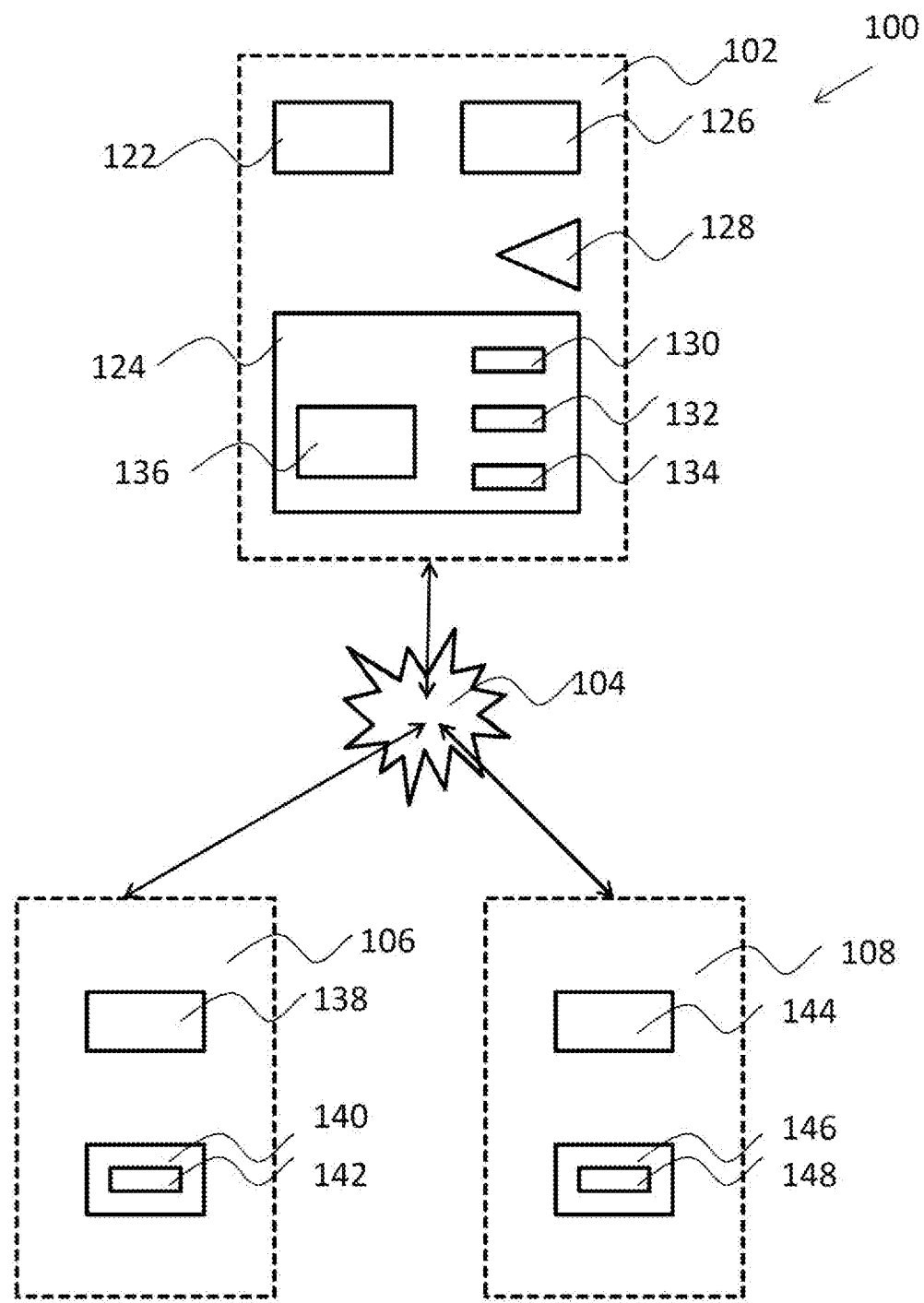
FIG. 1 shows a block circuit diagram of a navigation system.

FIG. 1 shows a block circuit diagram of a navigation system 100 having a navigation apparatus 102, a map server 106 and a server 108 for providing real-time traffic data, these being connected to one another via a network 104. The navigation apparatus may be a navigation device installed in the vehicle, a smartphone, a tablet or any other device having a navigation function. The navigation device has a user interface 126 having a touch display. A user is able to input a desired navigation destination using the touch display. A guided menu may be provided for this purpose. The touch display also serves to visually output navigation directions, for example in the form of a navigation route. The navigation device 102 furthermore contains a speaker 128 for outputting navigation instructions. The navigation device 102 is controlled by the processor 122 and has a memory 124 for storing map data 130, navigation data 132 and real-time traffic data 134.

The map data 130 may be drawn from a map server 106 via the network 104, for example a mobile radio network such as LTE, or already initially stored in the memory 130. The map server 106 contains a processor 138 for controlling and for retrieving map data 142 stored in the map database 140. The map server 106 provides a map section requested by the navigation device 102. The navigation and map module 136 uses the map data to calculate a digital map that is able to be displayed on the touch display 126.

In the navigation device, the map and navigation module 136 additionally uses an input performed by the user, the map section displayed on the display, the position of the vehicle and the direction of the vehicle to calculate navigation data 132 that are stored in the memory 124 and may be displayed from there in the display 126, for example in the form of a navigation route. The position of the vehicle may be determined using a GPS module and the direction of the vehicle may be determined using a compass, for example an electronic compass or a circular compass, or by way of detecting driving direction changes, for example by way of a gyro sensor, and correspondingly comparing these with map data, what is known as map matching. As an alternative, it is possible to calculate the navigation data 132 in an external server that is not illustrated here. The navigation data 132 in the form of navigation directions may additionally contain acoustic instructions and information that are output by way of acoustic output means 128, such as an audio interface or a speaker. The map and navigation module 136 may be a separately executable software application or a plug-in. The corresponding instructions may be precompiled and executed directly by the processor 122. As an alternative, they may be interpreted by another software application at runtime.

The navigation device 102 is additionally connected to the real-time traffic data server 108 via the network 104 in order to request real-time traffic data, such as for example reports about traffic congestion or temporary road closures. The real-time traffic data server 106 contains a processor 144 for controlling and for retrieving real-time traffic data 148 stored in the traffic database 146. The real-time traffic data 148 may be used to prompt calculation of alternative routes by way of the map and navigation module 136, which for this purpose accesses the real-time traffic data 148. The map and navigation module 136 for this purpose requests real-time traffic data 148 from the real-time traffic data server 108 at regular intervals, for example every minute, and stores these in the memory 124 as stored real-time traffic data 134. The map and navigation module 136 analyzes the stored real-time traffic data 134 with regard to their relevance for a current route plan. If for example the current route plan is not possible due to a road or traffic lane closure or the remaining travel time would be extended considerably due to traffic congestion, then the map and navigation module 136 calculates an alternative route. This is intended to be illustrated with reference to FIG. 2.

Figure 2:
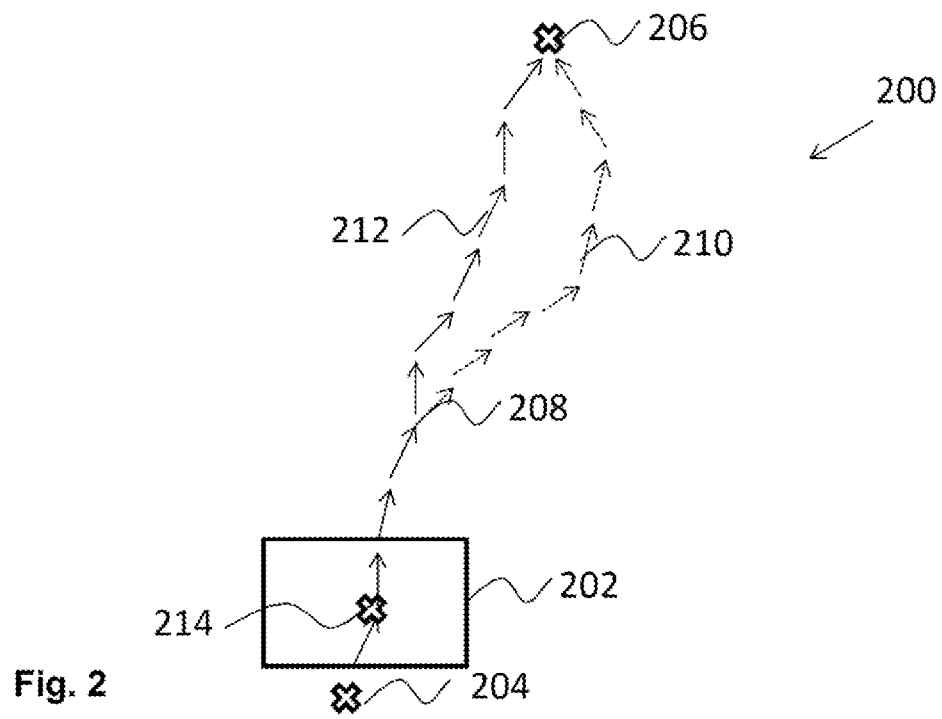
FIG. 2 shows a schematic illustration of an ongoing navigation session.

FIG. 2 shows an original route plan, generated by the navigation device, between starting point 204 and destination 206, which route plan was generated by the map and navigation module 136 on the basis of user inputs. The navigation directions 212 of the original route plan are illustrated by way of unbroken arrows. FIG. 2 furthermore shows an alternative route plan having alternative navigation directions 210 that are illustrated by way of dashed arrows. The alternative route plan begins at the diversion location 208. The alternative route plan was displayed due to traffic congestion on the original route. The vehicle is situated at a current location 214 on the original route. A current map section 214 is displayed on the display 126 of the navigation device 102. In this exemplary embodiment, the location of the deviation 208 is situated far outside the displayed map section 202. This lies firstly at the set zoom level, which is high here, that is to say a large amount of detail is currently displayed, and secondly at the distance between the current location 214 of the vehicle and the location of the deviation 208. If the user were already to be given information about the alternative route plan at this point, then the user would possibly be distracted unnecessarily, since it is possible that the traffic congestion on the original route will have resolved again before the location of the diversion is reached. In this case, the map and navigation module 136, which regularly requests real-time traffic data, would update the route plan to the original route plan. The user would be distracted unnecessarily. The map and navigation module 136 therefore generates information about a change depending on the zoom level of the map section displayed on the display in relation to the location of the deviation between original route and alternative route. In this case, the information for the user would initially be suppressed, since the location of the deviation is situated far outside the displayed map section. If the user moves further along the route with the zoom of the map section remaining the same, then he reaches a location at which information about the change to the route plan is displayed.

Figure 3:
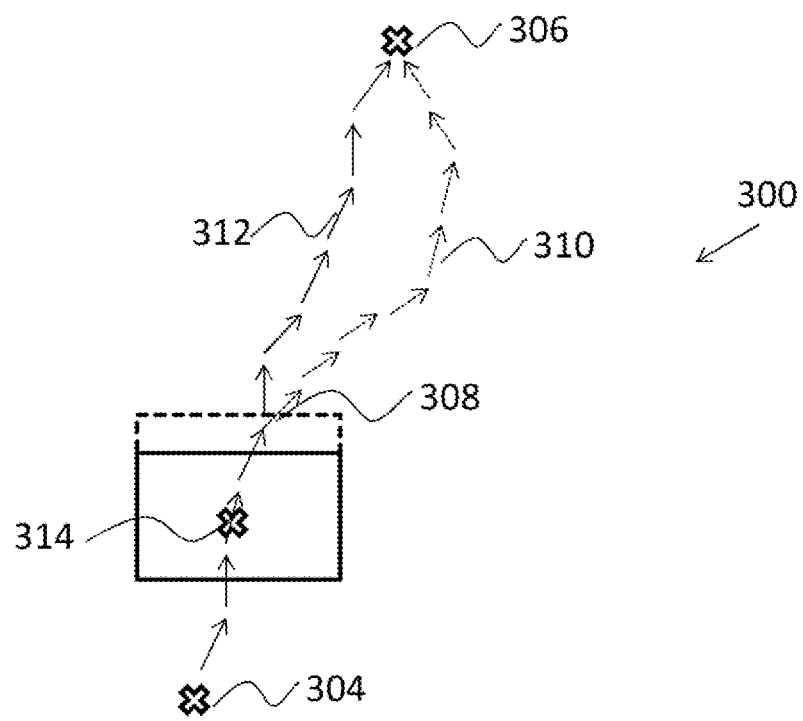
FIG. 3 shows a further schematic illustration of an ongoing navigation session.

FIG. 3 shows the route plan illustrated in FIG. 2, wherein the driver has moved slightly further along the original route 312 between starting point 304 and destination 306, and is now situated at the location 314 further away from the starting point 304. The map section 314 has the same level of detail as in FIG. 2, and therefore the zoom has not changed. The location of the deviation 308 is now situated closer to the upper edge of the map section displayed on the display. The location of the deviation 308 is situated here within a distance that corresponds to 20% of the vertical image height of the displayed map section 414 and is illustrated by the dashed line. Since, due to the high zoom level, the location of the deviation will soon be reached and leads to imminent driving maneuvers, the map and navigation module 136 determines that acoustic information about the changed route plan should be output to the user by way of the acoustic output means 128. The user may already at this point lower the zoom level on account of this acoustic information and thus view the changed route plan on the display 126. The original route 212 and the alternative route 210 are displayed to the user in parallel for a certain period of time, wherein the alternative route 210 is displayed differently than the original route 212. The alternative route 210 may be displayed in another color, or flash. As an alternative to lowering the zoom level, the user may however also maintain the current high zoom level. In any case, the travel time changed by the alternative route may be displayed as an overlap of original travel time and a difference between original and changed travel time. Due to the traffic congestion situated on the original route 312, it is assumed that the travel time increases due to the alternative route 310. The changed travel time is therefore displayed as original travel time plus additional travel time. Using this information, the user is able to decide whether he maintains or lowers the zoom level in order to view the entire alternative route plan.

Figure 4:
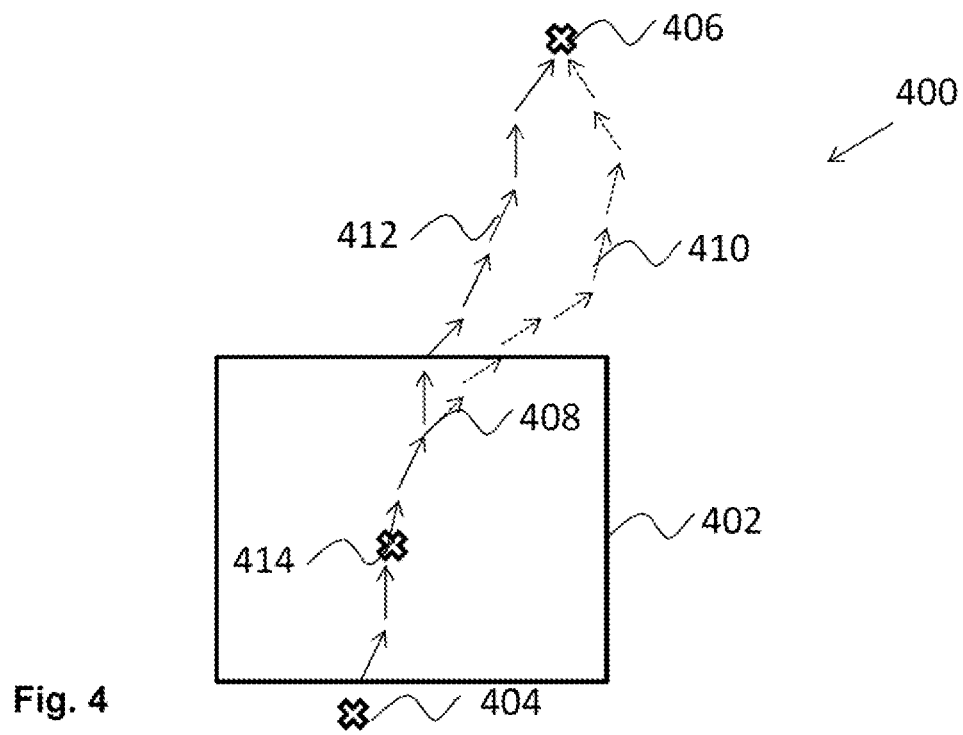
FIG. 4 shows a further schematic illustration of an ongoing navigation session.

FIG. 4 shows the route plan illustrated in FIG. 2, wherein the driver has again moved along the original route between starting point 404 and destination 406, and is now situated at the same point 414 as shown in FIG. 3. The map section 314 however has a lower level of detail than in FIG. 2 and FIG. 3. This is a map section that is further zoomed out, that is to say a map section having a low zoom level. It is assumed that the driver has just changed the zoom level of his own volition such that the changed part of the route comes into the display region, as therefore does the location of the deviation 408 between original route 412 and alternative route 410. At this moment, the driver is distracted in any case, such that the additional distraction by acoustic information about the change to the route plan is insignificant. For this reason, when the zoom level is changed, the acoustic information is output by way of the output means 128.

Figure 5:
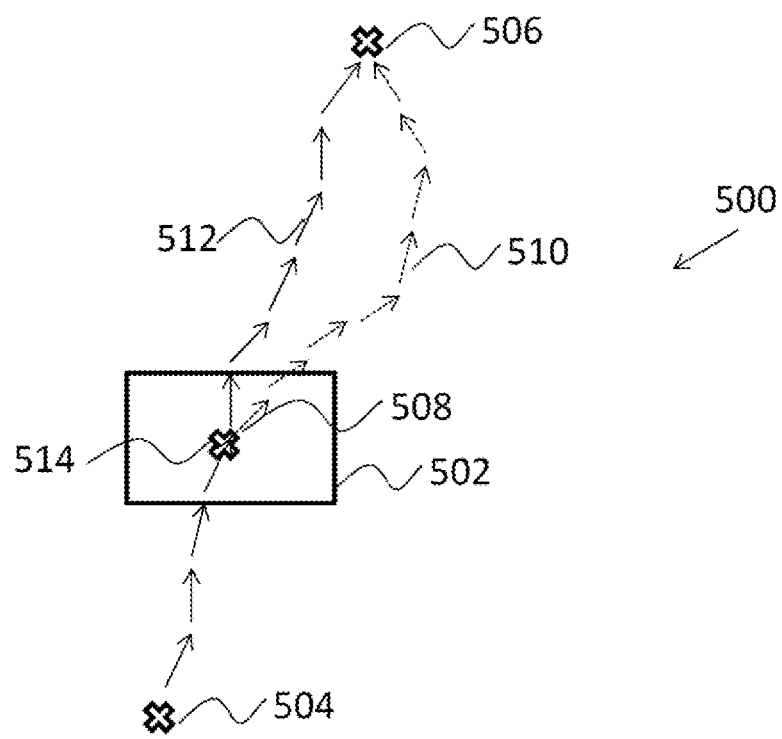
FIG. 5 shows a further schematic illustration of an ongoing navigation session.

FIG. 5 shows the route plan illustrated in FIG. 2, wherein the driver has again moved along the original route 512 between starting point 504 and destination 506 and is situated at a point 514 that is situated immediately before the location of the deviation 508 between the original route 512 and the changed route 510. The map section 314 has the same level of detail as in FIG. 2 and FIG. 3. This is a map section 314 having a high zoom level. It is assumed that the map and navigation module 136 has just requested real-time traffic data 148 from the real-time traffic data server 108, has stored these in the memory 124 as stored real-time traffic data 134 and has analyzed the stored real-time traffic data 134 with regard to their relevance for a current route plan. As a result of this analysis, the map and navigation module 136 has determined that an alternative route 510 should be taken. The driver is informed directly about this route change by way of the touch display, since he is already situated in the immediate vicinity of the location of the deviation between original route 512 and changed route 510. Since the immediately upcoming route change requires the attention of the driver in any case, the map and navigation module 136 additionally prompts acoustic information by way of the acoustic output means 128.

In all of the configurations described above, there may be provision for acoustic information about the changed route plan to only be issued at all if the travel time increases by a particular period of time. This is illustrated in the flowchart in FIG. 6 in connection with FIG. 1.

In the navigation apparatus 102, the map and navigation module 136 uses the stored map data 130 and real-time traffic data 143 to generate navigation data 132 in the form of updated navigation directions along an original route to a destination in step 602. The map and navigation module 136 determines an alternative route to the destination, including a location of the deviation between the original route and the alternative route in step 604, if the updated navigation directions deviate from the original navigation directions. The map and navigation module stores the navigation data 132 in the memory 124. In step 606, the map and navigation module 136 determines whether the journey time on the alternative route increases by at least a predefined time interval. This time interval may be preset by the driver using the user interface 126 and stored in the memory 124. The time interval may be predefined in absolute terms, for example 3 or 5 min, or as a percentage with respect to the original travel time still remaining. If the travel time does not increase at least by the predefined time interval, then the method ends, since generating acoustic information about the route change would result in an unnecessary distraction of the driver. If by contrast the travel time increases at least by the predefined time interval, then the map and navigation module 136 checks whether the vehicle is situated on the original route. If the vehicle is not situated on the original route, then it is assumed that the driver has not followed the proposed original route and has set off on the alternative route himself. Since this is now connected with a considerable increase in the travel time, the map and navigation module 126 generates acoustic information by way of the acoustic output means 128. If it is established in step 608 that the vehicle is situated on the original route, then the map and navigation module 136 determines in step 610 whether the location of the deviation between original route and alternative route is situated far outside the current map section. If this is not the case, then the map and navigation module 126 generates acoustic information by way of the acoustic output means 128. If this is not the case, then this would result in unnecessary distraction of the driver at this point, due to which the method ends.

Figure 6:
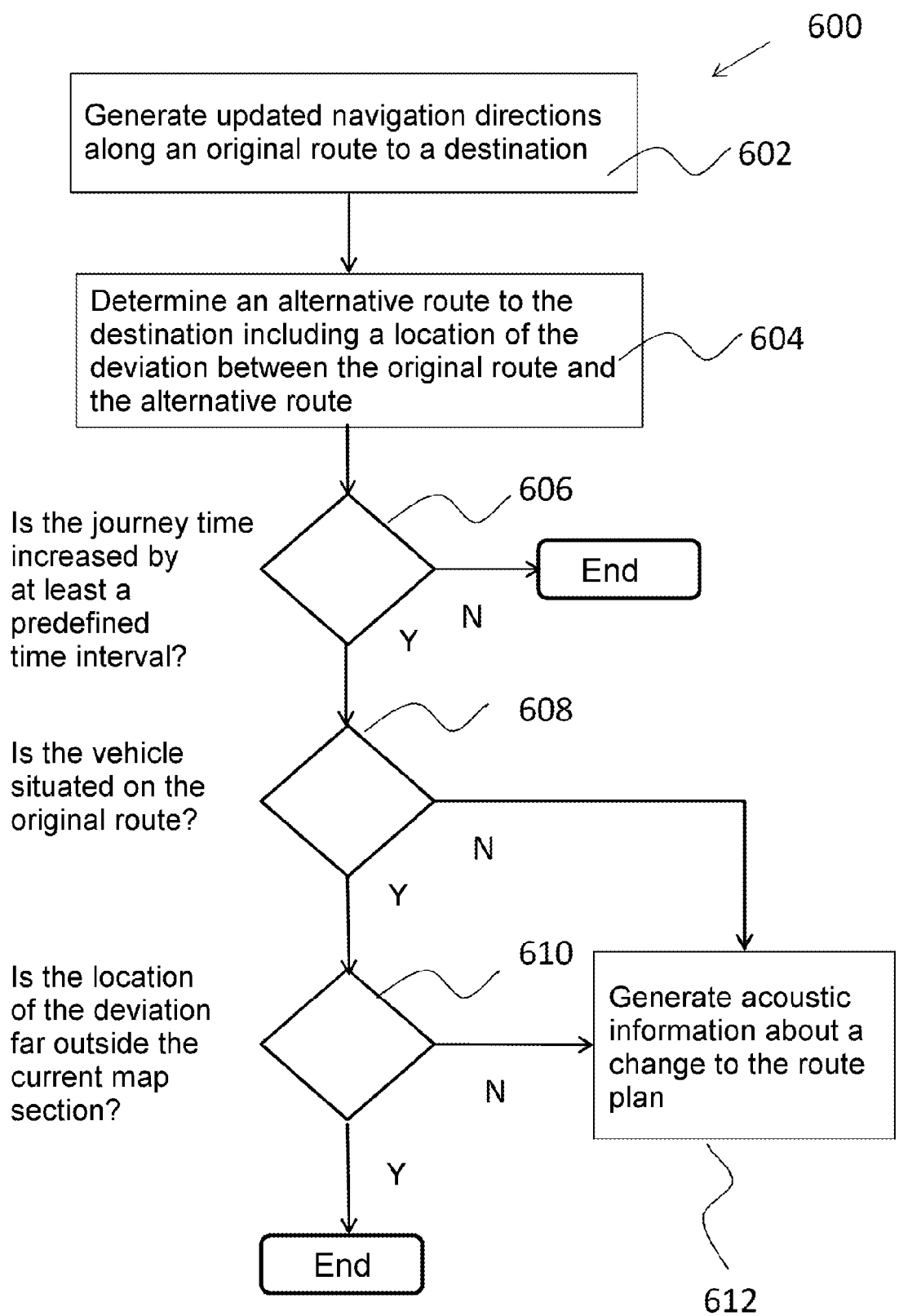
FIG. 6 shows a flowchart of one configuration of the method.

The method illustrated in FIG. 6 may also be implemented by an alternative navigation architecture in comparison with the navigation architecture shown in FIG. 1. A vehicle may thus have a plurality of universally usable computer units, which may be designed for example as controllers (electronic control units, ECUs). In this case, a navigation application containing the method illustrated in FIG. 6 runs on a portable communication device, for example a smartphone, tablet or phablet. In this case, the vehicle may be a short-term rental vehicle of a floating-car rental fleet, and the rental procedure and the authorization process for the driver on the vehicle may also be implemented by way of the portable communication device or applications thereon. In this case, the communication device has the role of a human-machine interface (HMI). A back-end provides map and real-time traffic data able to be accessed by at least one universally usable computer unit. One or more universally usable computer units calculate navigation data. This has the advantage that, in the case of more detailed navigation datasets, such as for example in the case of eHorizon, the more powerful hardware of the universal computer units of the vehicle is used.

The driver of a vehicle may approach the vehicle with his portable communication device and authorize himself, wherein the portable communication device establishes a communication connection with the vehicle. The driver may then launch a navigation application on the communication device, wherein the communication device serves as an HMI and also uses ECUs of the vehicle, whose computational power is provided by the vehicle, for the calculation. It is not defined whether the communication connection to the back-end, which holds the detailed map information, in this case runs by way of apparatuses of the vehicle or of the portable communication device. Since every driver carries his own portable communication device with him, there are a multiplicity of possible combinations of vehicle computer units and portable communication device.

As an alternative, a navigation device may be used that holds static map information in an internal memory and calculates the route plan itself. It receives dynamic inputs by determining the position by way of the global navigation satellite system (GNSS) and traffic information via radio, for example by way of a traffic message channel. If in this case a congestion report/closure occurs that leads to an insignificant route change, the method illustrated in FIG. 6 may be used.

The invention claimed is:

1. A method for generating dynamic information about a change to a route plan for an automotive vehicle, comprising:

when a location of a deviation between an original route, from a starting point to a destination, and an alternative route to the destination is situated at a predefined distance outside an edge of a visible map section displayed on a display, providing a voice notification that a change has been made to the route plan; and when the location of the deviation between the original route and the alternative route is situated beyond the predefined distance outside the edge of the visible map section displayed on the display, refraining, until the location of the deviation between the original route and the alternative route is situated at the predefined distance outside the edge of the visible map section displayed on the display, from providing the voice notification that the change has been made to the route plan in order to reduce driver distraction, wherein the predefined distance is greater than 10% of a vertical image height of the visible map section displayed on the display.

2. The method as claimed in claim 1, wherein the predefined distance is able to be set or selected by a user.

3. The method as claimed in claim 1, wherein the voice notification about a change to the route plan is provided when the location of the deviation is expected to be displayed in the map section displayed on the display within a predefined time interval.

4. The method as claimed in claim 1, wherein the voice notification is provided only when an arrival time changes by a predefined time or a predefined distance due to the change to the route plan.

5. The method as claimed in claim 1, also comprising: at least temporarily displaying an entire route between the starting point and the destination on the display, wherein the alternative route is displayed in highlighted form.

6. The method as claimed in claim 1, also comprising: at least temporarily displaying a partial area of an entire route between the starting point and the destination on the display, wherein the partial area of the entire route comprises the alternative route.

7. The method as claimed in claim 6, wherein the alternative route is displayed in a different color from the original route, or in flashing form.

8. The method of claim 1, wherein the predefined distance is greater than 15% of a vertical image height of the map section displayed on the display.

9. The method of claim 1, wherein the predefined distance is greater than 20% of a vertical image height of the map section displayed on the display.

10. The method of claim 1, wherein the predefined distance is greater than 25% of a vertical image height of the map section displayed on the display.

11. A navigation device having:
output means for, when a location of a deviation between an original route, from a starting point to a destination, and an alternative route to the destination is situated at a predefined distance outside an edge of a visible map section displayed on a display, providing a voice notification that a change has been made to the route plan, and, when the location of the deviation between the original route and the alternative route is situated beyond the predefined distance outside the edge of the visible map section displayed on the display, refraining, until the location of the deviation between the original route and the alternative route is situated at the predefined distance outside the edge of the visible map section displayed on the display, from providing the voice notification that the change has been made to the route plan in order to reduce driver distraction, wherein the predefined distance is greater than 10% of a vertical image height of the visible map section displayed on the display.

12. The navigation device as claimed in claim 11, wherein the predefined distance is able to be set or selected by a user.

13. The navigation device as claimed in claim 11, wherein the voice notification about a change to the route plan is provided when the location of the deviation is expected to be displayed in the map section displayed on the display within a predefined time interval.

14. The navigation device as claimed in claim 11, wherein the voice notification is provided only when an arrival time changes by a predefined time or a predefined distance due to the change to the route plan.

15. The navigation device as claimed in claim 11, also comprising: at least temporarily displaying an entire route between the starting point and the destination on the display, wherein the alternative route is displayed in highlighted form.

16. The navigation device as claimed in claim 11, also comprising: at least temporarily displaying a partial area of an entire route between the starting point and the destination on the display, wherein the partial area of the entire route comprises the alternative route.

17. The navigation device as claimed in claim 16, wherein the alternative route is displayed in a different color from the original route, or in flashing form.

18. The navigation device of claim 11, wherein the predefined distance is greater than 15% of a vertical image height of the map section displayed on the display.

19. The navigation device of claim 11, wherein the predefined distance is greater than 20% of a vertical image height of the map section displayed on the display.

20. The navigation device of claim 11, wherein the predefined distance is greater than 25% of a vertical image height of the map section displayed on the display.

* * * * *